Jan. 2, 1934.   K. FRENZEL   1,941,602
PHOTOGRAPHIC CAMERA
Filed July 9, 1926   5 Sheets-Sheet 1
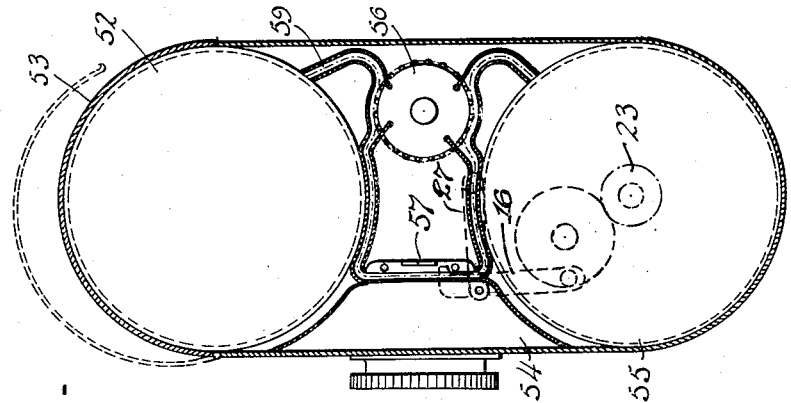
INVENTOR
KURT FRENZEL
BY
ATTORNEYS Jan. 2, 1934. K. FRENZEL 1,941,602
PHOTOGRAPHIC CAMERA
Filed July 9, 1926 5 Sheets-Sheet 2
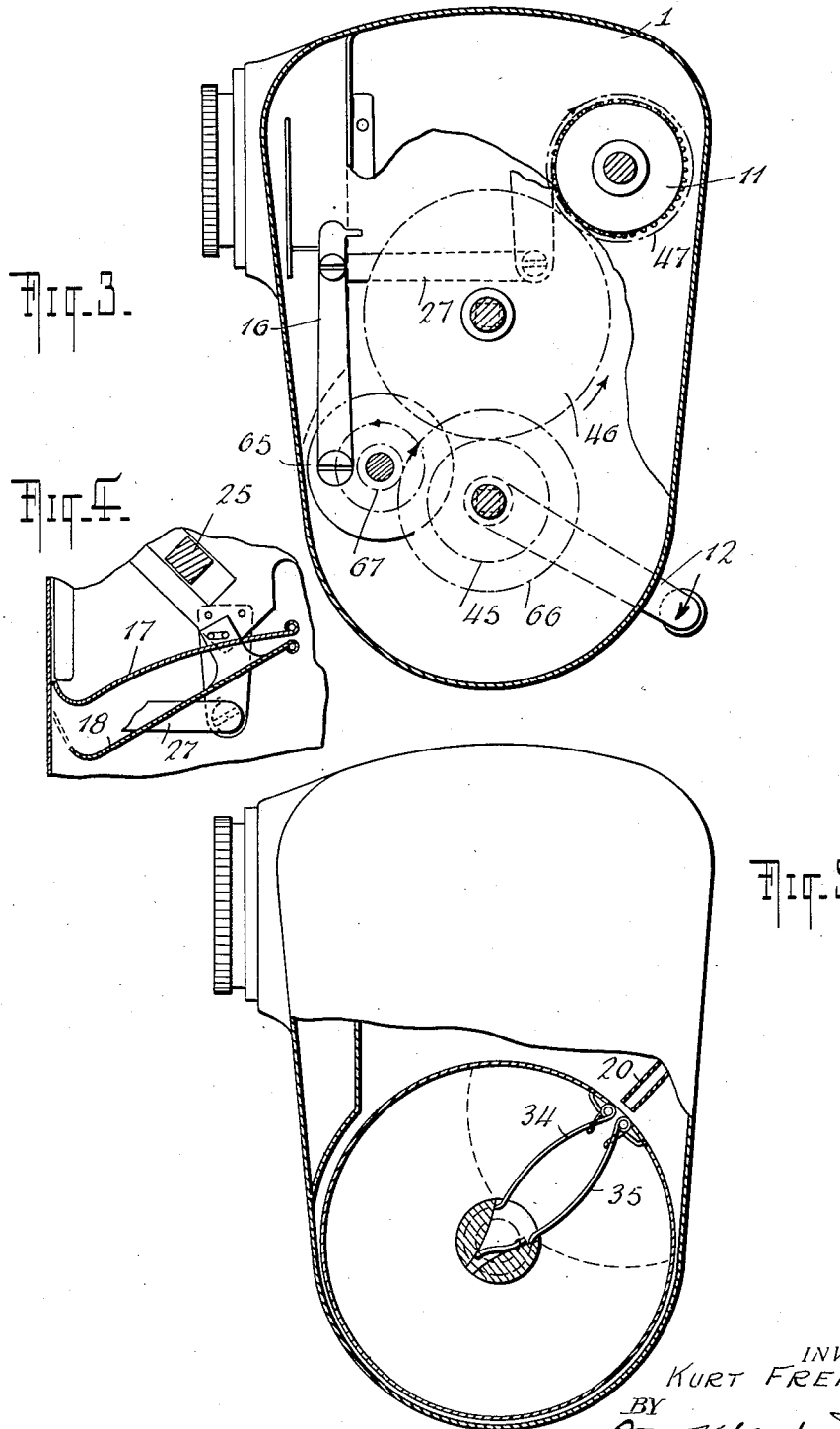
INVENTOR
KURT FRENZEL
BY
ATTORNEYS Jan. 2, 1934.  K. FRENZEL  1,941,602
PHOTOGRAPHIC CAMERA
Filed July 9, 1926   5 Sheets-Sheet 3
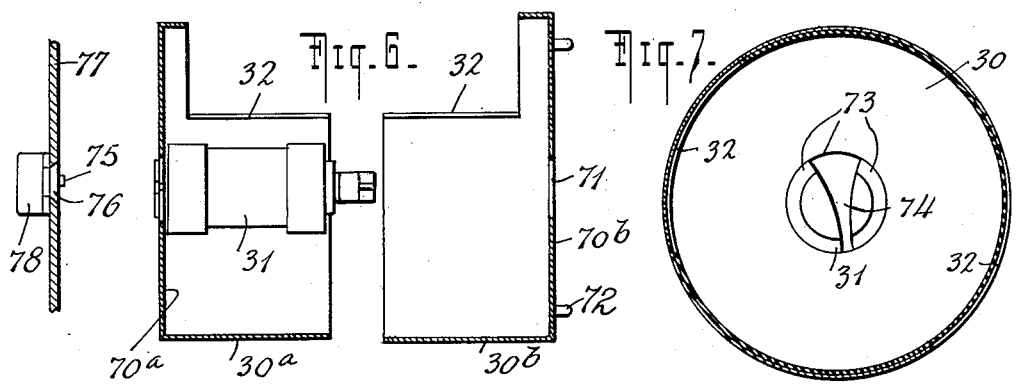
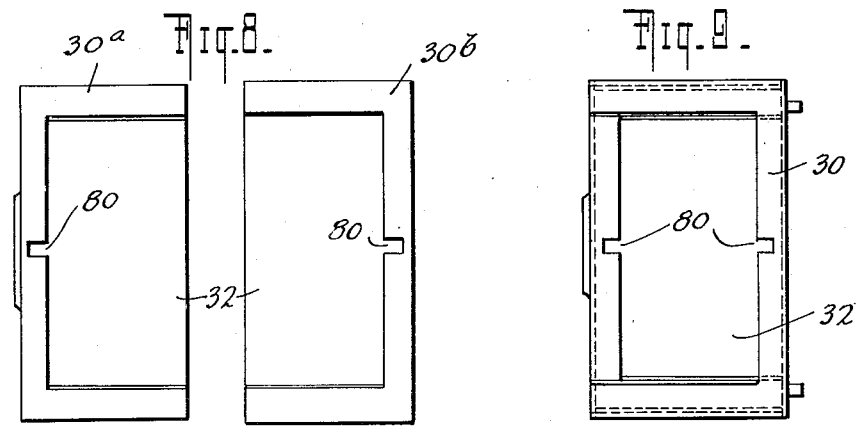
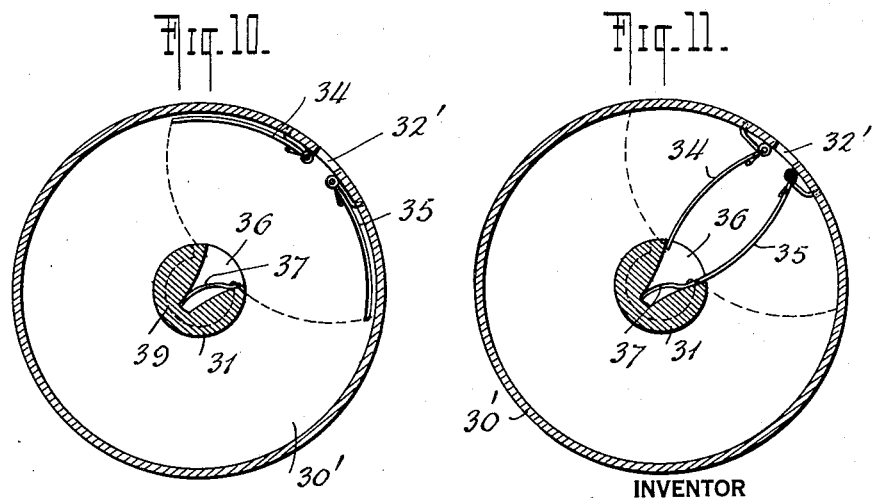
INVENTOR
KURT FRENZEL
BY
ATTORNEYS

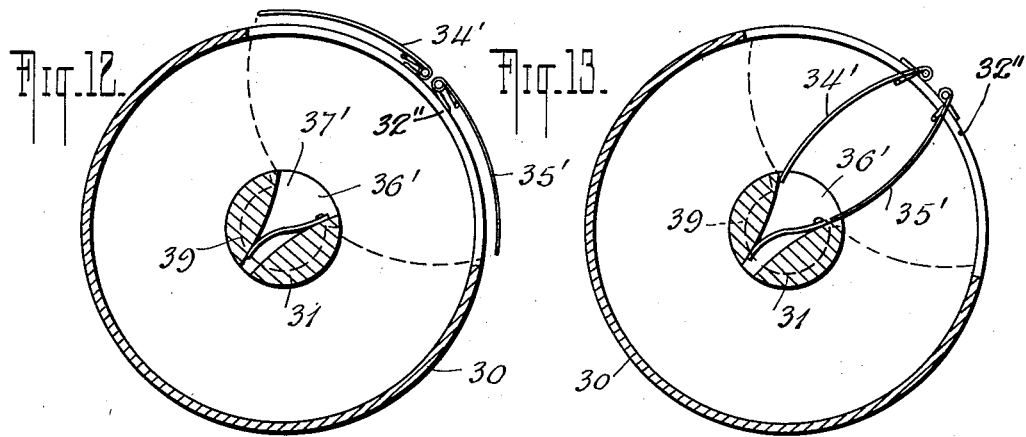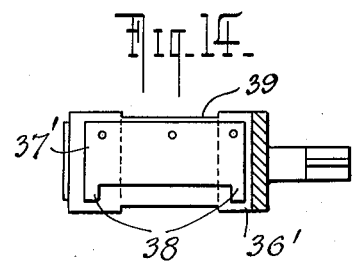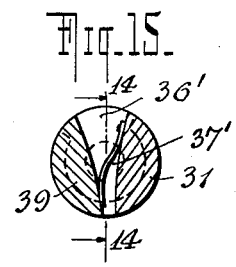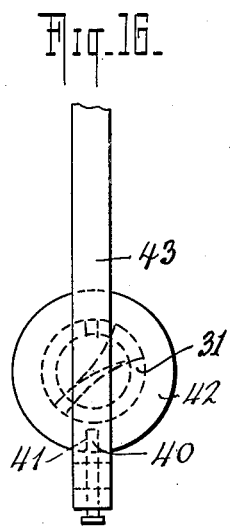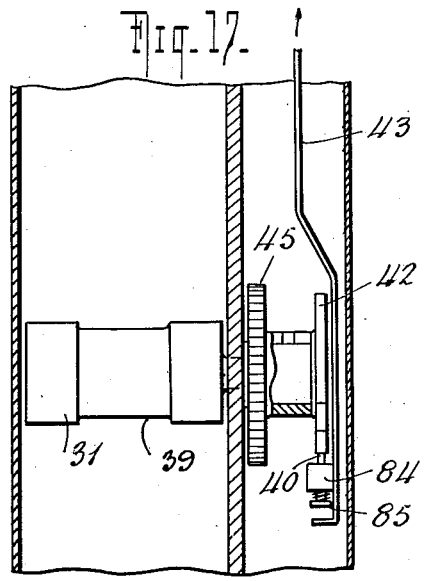

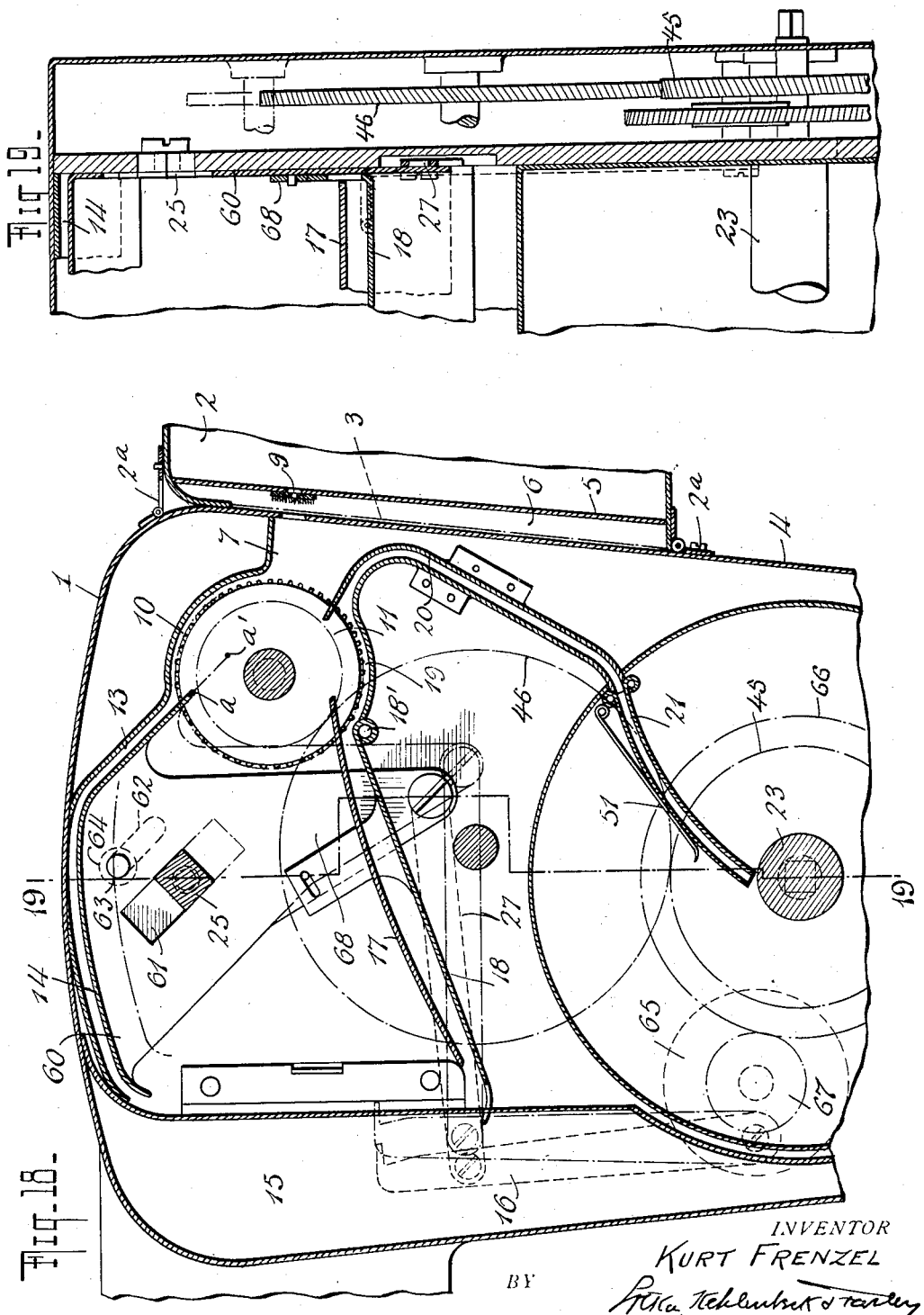

Patented Jan. 2, 1934

1,941,602

UNITED STATES PATENT OFFICE

1,941,602

PHOTOGRAPHIC CAMERA

Kurt Frenzel, Berlin, Germany, assignor, by mesne assignments, to Eastman Kodak Company, a corporation of New York Application July 9, 1926, Serial No. 121,305, and in Germany July 9, 1925

14 Claims. (Cl. 88—17)

My invention relates to improvements in photographic cameras, and more particularly in kinematographic cameras. The object of the improvements is to provide a camera in which the film can be automatically inserted without opening the camera. With this object in view my invention consists in providing a passage within the camera in which the inserted end of the film is positively guided, the said passage extending from a slot made in the wall of the camera to the exposure opening and a drum on which the exposed film is wound up, so that the film is first passed over a feed drum, thereafter into position for being exposed, back to the feed drum, and finally to a bobbin on which it is wound up. Further, I provide a casing in which the sensitized film is stored, and which is adapted to be connected with the camera in such a way that the film can be removed therefrom and passed into the camera without being exposed to the light. Other objects of the improvements will be understood from the following description.

For the purpose of explaining the invention several examples embodying the same have been shown in the accompanying drawings, in which the same reference characters have been used in all the views to indicate corresponding parts. In said drawings, Fig. 1 is a sectional elevation of the camera having a casing from which the film is taken attached thereto, Fig. 2 is a similar sectional elevation showing a modification in which the casing containing the sensitized film is disposed within the camera, Fig. 3 is a sectional elevation of the camera showing the film feeding mechanism, Fig. 4 is a detail view showing a part of Fig. 1, Fig. 5 is an elevation partly in section showing another modification of the camera, Figs. 6 to 9 are detail views showing the casing containing the film in different positions, Fig. 6 showing the two main parts composing the said casing separate from each other, Fig. 7 being a sectional elevation, Fig. 8 showing a top-plan view of the parts of the casing, and Fig. 9 being a top-plan view showing the said parts assembled, Figs. 10 and 11 are sectional views showing a modification of the casing, Figs. 12 and 13 are similar sectional elevations showing another modification of the casing, Fig. 14 is a longitudinal section on line 14—14 of Fig. 15, the latter being a cross section of the member on which the bobbin carrying the film is mounted, Figs. 16 and 17 are detail views showing locking means for the member shown in Figs. 14 and 15, Fig. 16 being a detail view looking from the right in Fig. 17 and Fig. 17 being a sectional elevation, Fig. 18 is an enlarged fragmentary section similar to Fig. 1, and Fig. 19 is a section thereof on the line 19—19 of Fig. 18.

In the example shown in Fig. 1 my improved apparatus comprises a camera 1 and a casing 2 adapted to be attached thereto. Preferably the casing 2 is made from card board, and it is adapted to be placed with its left hand wall on the outer face 4 of the wall of the camera, suitable means 2a being provided on the camera for securing the casing 2 thereto. At the side to be fixed to the wall of the camera the casing is provided with two walls 3 and 5 including a space 6 between the same. The outer wall 3 is made so that it can be readily removed, for which purpose it is made for example from paper adapted to be torn before attaching the casing 2 to the camera. The free end 7 of the film is passed through a slot 9 made in the wall 5, and it projects into the space 6. In front of the slot 9 a short guiding member 8 made from card board or the like is preferably fixed to the wall 5, and the said member is internally provided with light excluding linings of velvet or the like, as is known in the art, the said end 7 projecting from the guiding member a suitable distance and into the space 6. When placing the casing 2 on the wall of the camera 1, the wall 3 is first removed, and the end 7 of the film is bent upwardly and passed through a slot 9' made in the wall 4 of the camera, the guiding member 8 holding the end 7 in a definite direction. In Fig. 1 I have shown the casing 2 in the state of being applied to the camera, and it should be understood that the outer wall 3 (shown in dotted lines) has been removed.

The camera comprises a bottom part in which a bobbin 23 is mounted on which the film is wound up after being exposed. In the top part of the camera a pair of feeding disks 11 formed with sprockets and a frame 15 formed with an exposure opening are mounted. The bobbin 23 and feeding disks 11 are adapted to be operated by suitable mechanism such for example as a crank 12 and gear wheels 45, 46 and 47. For conveying the film from the slot 9 to the exposure opening 15 and the bobbin 23 a guide way is provided in the camera, which is constructed as follows: The first part of the guide way beginning from the slot 9 comprises a curved wall 10 disposed concentrically of the disks 11 and forming a passage therewith, the sprockets of the disks 11 extending closely to the said wall and being adapted to be passed through the usual perforations of the film. The next portion of the guide way consists of a bent wall 13 the end of which is directed downwardly and towards the exposure opening in the frame 15. Below the wall 13, which is fixed to the side walls of the camera, there is a wall 14 which is mounted for adjustment from the position shown in Figs. 1 and 18 in full lines therein into the position shown in dotted lines, the said wall being adapted to be shifted substantially at an angle of 45° downwardly and to the right, two points $a$ and $a'$ indicating the end positions of the right hand margin of the wall 14. When thus shifting the wall the right hand bottom part thereof passes downwardly between the disks 11. The section of the guide way included between the bottom or delivery end of the exposure opening in the frame 15 extends to the bottom side of the feeding disks 11, and it comprises a stationary part 17 and a movable part 18 located below the same and adapted to be rocked about its pivot 18' into the position shown in dotted lines. The next section of the guide way consists of a wall 19 disposed concentrically of the disks 11, and the last section of the guide way consists of a passage 20, 21 extending from the bottom of the feeding disks 11 to the bobbin 23. Thus the film is fed by the sprockets of the disks 11 at the part before and behind the exposure opening. In the operation of the apparatus the disks 11 are continuously rotated, while the film is intermittently moved past the exposure opening in the frame 15. Such intermittent movement is possible because loops are formed in the film before and behind the exposure opening by moving the walls 14 and 18 into the positions shown in dotted lines.

The walls 14 and 18 are operated by a slide which is more fully referred to hereinafter. While inserting the film through the guide way the walls are in the positions shown in full lines so that a loop is produced in the upper portion of the guide way, while at the bottom the film is passed between the walls 17, 18 in an approximately straight line from the exposure opening to the disks 11. Thus a continuous guide way is produced through which the film can be readily inserted until its end arrives at the bobbin 23 to which it is fixed in the manner to be described hereinafter.

The slide carrying the wall 14 comprises two plates 60 (one at each side of the camera) made from sheet metal and formed with rectangular slots 61 disposed substantially at an angle of 45° to the horizontal. By means of the said slots the slide is guided on bolts 25 of square cross-section fixed to the side walls of the camera, the length of the said slots being such that the slide can be shifted from $a$ to $a'$. The slide is moved along its inclined path from the outside of the camera, for which purpose one or both side walls of the camera are formed with a slot 62 through which pins 63 fixed to the plates 60 project outwardly, said pins carrying suitable buttons 64 for shifting the slide composed of the plates 60. The wall 18 is provided with an arm 68 having a pin-and-slot connection with one of the plates 60 to rock the wall 18 on its pivot 18' when the slide 60 is shifted.

For imparting intermittent movement to the portion of the film moving past the exposure opening in the frame 15 a pawl 16 is provided, which is jointed at its bottom end to a disk 65 adapted to be rotated from the crank 12 through the intermediary of gear wheels 66 and 67. Thus whenever the crank 12 is rotated, the pawl 16 will be reciprocated up and down owing to its eccentric connection with the disk 65. The pawl 16 is connected by a link 27 with the lower end of one of the plates 60 (see Figs. 1 and 18). While the slide 60 is in its upper position shown in Fig. 1 in full lines the pawl 16 is disposed in the position away from the exposure opening as has been shown in dotted lines, and by shifting the slide 60 downwardly and to the right the pawl 16 is rocked to the right and into engagement with the perforations of the film band, Fig. 1 showing the pawl in the position in which it is just feeding the film downwardly. The direction of the rotation of the wheels driving the disks 11 and the pawl 16 has been indicated by arrows.

If now the slide 60 is moved downwardly by means of the buttons 64 projecting to the outside of the camera the walls 14 and 18 of the guide way are moved downwardly and into the positions shown in dotted lines. Further, by the said movement the link 27 connecting the slide with the pawl 16 shifts said pawl into operative position and into engagement with the perforations made in the film band. If now the crank 12 is operated the pawl 16 intermittently advances the film, while the feeding disks 11 impart continuous feeding movement to the portions of the film located before and behind the exposure opening in the frame 15, such intermittent and continuous movements of the portions of the film band being possible by reason of the loops formed in the film band after the walls 14 and 18 have been moved downwardly.

In the camera so far described the film is inserted by means of the feeding disks 11 which are operated from the outside of the camera, and which advance the film into operative position within the camera while the said camera is closed. By removing the walls 14 and 18 from the film guide way the friction of the film is reduced.

An important feature of the invention resides in that the pawl 16 can be set into inoperative position from the outside of the camera before inserting the film band. Another important feature resides in that the slide 60 controlling the position of the walls 14 and 18 can be moved from the outside of the camera. By operating the pawl 16 and the walls 14 and 18 by means of the same device 64 the construction and operation of the camera is made comparatively simple.

In Fig. 2 I have shown a modification of the camera in which the casing 52 from which the sensitized film is supplied to the camera is mounted within the top part of the camera 54, the said camera being provided with a hinged lid 53. In the bottom part of the camera there is a casing 55 which is preferably made from thin sheet metal, and which is designed to receive the exposed films. In the median part of the camera there are two feeding disks 56 provided with sprockets and a frame 57 formed with an exposure opening. The film is conveyed from the casing 52 to the casing 55 through a guide way 59 constructed in a similar way as has been described with reference to Fig. 1, the film being intermittently advanced by means of a pawl which is likewise constructed and operated in the manner described before.

In Figs. 6 to 9 I have shown the preferred construction of a casing containing the sensitized film and designed to receive the film after exposure thereof. In the construction shown in Fig. 1 the said casing is adapted to be placed into the casing 2 and in the bottom part of the camera.

As appears from Figs. 6 to 9 the said casing consists of two cylindrical members 30a and 30b preferably made from sheet metal and each having a closed bottom 70a and 70b. The bottom 70b is formed with a central hole 71 through which the shaft of the bobbin 31 is inserted, the said shaft carrying the crank 12. Further, the bottom 70b is formed with two pins 72 adapted to be passed into corresponding sockets made in one of the side walls of the camera, the object of the said pins being to fix the section 30b in position within the camera. The bottom 70a is formed at its outer face with two lugs 73 spaced from each other to provide a slot 74, and the said slot is adapted to be engaged by a rib 75 provided on a pin 76 rotatably mounted in the wall 77 of the camera and carrying a wing or handle 78 by means of which the section 30a of the casing can be turned. The sections 30a and 30b are formed with corresponding segmental cut-out portions 32, and at corresponding parts the circumferential walls of the sections 30a and 30b are formed with recesses 80.

The sensitized film wound on the bobbin is placed into the section 30a of the casing, whereupon the section 30b is slipped over the section 30a. Thereafter the sections are turned relatively to each other so that the segmental recesses 32 are displaced with relation to each other and each recess is closed by the solid part of the other section. Thus light is excluded from the film. The casing 30a, 30b is now placed into the casing 2, whereupon the latter casing is closed so as to exclude light. After the film has been taken from the casing 2, the casing 30a, 30b is used for winding exposed films thereon, for which purpose it is removed from the casing 2, and the section 30b is removed from the section 30a and placed into the bottom part of the camera after removing one of the end walls thereof, the pins 72 engaging in the corresponding notches. Now the bobbin 31 is placed into the casing section 30b and the section 30a is shifted over the same, the segmental recesses 32 being in corresponding positions, so that the casing 30a, 30b is provided with a rectangular opening, as is shown in Fig. 9. In the operation of the camera the film is passed into the said casing through the said opening, and it is guided at its margins within the recesses 80. If it is desired to remove the film from the camera the section 30a of the casing is first turned by means of the handle 78 so far that the segmental recesses 32 are respectively covered by the solid walls of the opposite section. Now the casing may be removed.

In Figs. 10 and 11 I have shown means for guiding the film inserted into the casing 30' of the bobbin 31. As shown the bobbin 31 is formed with a longitudinal recess 36 adapted to receive the end of the film. Within the said recess there is a leaf spring 37 adapted for clamping engagement with the end of the film. The casing 30' is formed with a comparatively narrow slot 32', and at opposite sides of the said slot a pair of curved plates 34 and 35 are jointed to the circumferential wall of the casing, the said plates being acted upon by springs (not shown) tending to rock the same outwardly and against the inner circumferential wall of the casing 30'. The length of the plates 34 and 35 is such that they are adapted to engage in the recess 36 and to be locked therein, as is shown in Fig. 11. The bobbin 31 is formed with a circumferential recess 39.

When inserting the casing 30' into the camera the plates 34 and 35 are first set into the positions shown in Fig. 11. Now the front end of the film is safely passed between the said plates and into the recess 36 in which it is clamped in position by the spring 37. If now the camera is operated and the bobbin 31 rotated, for example in clockwise direction, the plate 35 is first released and rocked by its spring into the position shown in Fig. 10. The plate 34 is first carried along by the edge of the recess 36, but after a very short movement it is released by the said edge and is rocked outwardly, the recess 39 providing sufficient clearance to permit such outward movement.

In the modification shown in Figs. 12 to 15 the casing 30 is formed with a segmental recess of the size shown in Figs. 6 and 7, and the rockable plates 34' and 35' are hinged to a fixed part of the camera. The recess 36' of the bobbin extends diagonally through the bobbin, so that the end of the film may be passed entirely through the said recess. The operation of the apparatus is the same as that described with reference to Figs. 10 and 11, the plates 34' and 35' being first held in the positions shown in Fig. 13 by the edges of the recess 36' and thereafter rocked outwardly by their springs through the recess 32''.

From the foregoing description it will be understood that the bobbin 31 must be in the proper position for receiving the end of the film. To insure the correct position suitable locking means for the bobbin are provided. Such means have been shown by way of example in Figs. 16 and 17. As shown in the said figures the shaft of the bobbin carries a disk 42 having a notch 41. An arm 43 connected with the slide 60 is formed with a lug 84 providing a guide for a locking pin 40, the said pin being connected by a spring 85 with the arm 43. When shifting the slide 60 into the position shown in Fig. 1 in which the film band is inserted into the camera, the arm 43 is concurrently shifted upwardly, so that the locking pin 40 rides on the circumference of the disk 42. If now the bobbin 31 is turned, the pin 40 engages in the notch 41 as soon as the bobbin is in the proper position, and it locks the bobbin in the said position. In the construction shown in Fig. 17 the crank 12 is not placed on the axis of the bobbin but on the shaft carrying the gear wheel 46, which for this purpose is formed with a square end, as is shown in Fig. 3. Thus the rotary movement of the gear wheel 46 is transmitted to the gear wheel 45, which is in frictional engagement with the shaft of the bobbin 31, as is known in the art.

While in describing the invention reference has been made to particular examples embodying the same I wish it to be understood that my invention is not limited to the constructions shown in the drawings, and that various changes may be made in the general arrangement of the apparatus and the construction of its parts without departing from the invention.

I claim:

1. A motion picture apparatus, comprising a casing provided with a slot for inserting the film, film feeding means, an opening, means for winding the film, means for intermittently moving the film across said opening, a guide way for passing said film from said slot, along said feeding means and opening and to said winding means, the portions of said guide way located at opposite sides of said opening being mounted for adjustment into film releasing positions, means to set said intermittently moving means into inoperative position, and common operating means for said movable parts of the guide way and the means for setting the intermittently moving means into inoperative position.

2. A motion picture apparatus, comprising the casing of the apparatus formed with a slot for inserting the film, a continuously operating film feeding member, an intermittent film feeding mechanism, a frame provided with an opening, a casing adapted to receive a spool core and the film, and a continuous closed guideway having opposing walls between which the film is adapted to pass, said guideway extending from said slot into operative relation to said continuously operating feeding member and across the said opening and from the latter back into operative relation to said feeding member and thence to said film casing up to the spool core.

3. A motion picture apparatus, comprising the casing of the apparatus formed with a slot for inserting the film, a continuously operating film feeding member, an intermittent film feeding mechanism, a frame provided with an opening, and a film-casing adapted to receive the film, and a continuous closed guideway extending from said slot along said feeding member toward and across said opening and away from the latter to said film casing, said guideway being provided, in those sections which lead toward and away from the opening, with portions adapted to be moved into film releasing positions.

4. A motion picture apparatus, comprising the casing of the apparatus formed with a slot for inserting the film, a continuously operating film feeding member, an intermittent film feeding mechanism, a frame provided with an opening, a casing adapted to receive the film, a continuous closed guideway, extending from said slot along the continuously operating feeding member and along the opening and to said film casing up to the receiving member section of said guideway capable of being adjusted to film releasing positions and means for adjusting said section of the guideway to a film releasing position and for concurrently setting said intermittently moving means into inoperative position.

5. A motion picture apparatus comprising the casing of the apparatus formed with a slot for inserting the film, a continuously operating film feeding member, an intermittent film feeding mechanism, a frame provided with an opening, a film receiving member arranged within the apparatus, a continuous closed guideway adapted when inserting the film to direct the same to said receiving member, and rockable guide members connected with the casing of the apparatus and adapted to guide the film to said receiving member.

6. A motion picture apparatus comprising the casing of the apparatus, having an opening, a frame for guiding the film across said opening, a continuously operating film feeding member, an intermittent film feeding mechanism, a film receiving member, a continuous closed guideway adapted when inserting the film to direct the same to said receiving member, said receiving member being formed with a recess for receiving the end of said film, and automatically retracted hinged guide members connected with the said casing of the apparatus, said guide members being adapted to engage said recess and to be held thereby in positions bridging the space between the circumference of the receiving casing and the receiving member when inserting the film to guide the film to the recess of the receiving member.

7. A motion picture apparatus comprising the casing of the apparatus, having an opening, a frame for guiding the film across said opening, a continuously operating film feeding member, an intermittent film feeding mechanism, a film receiving member, a continuous closed guideway adapted when inserting the film to direct the same to said receiving member, said receiving member being formed with a recess extending diametrically through the same, film clamping means within said recess, and automatically retracted hinged guide members connected with the casing of the apparatus, said guide members being adapted to engage said recess and to be held thereby in positions bridging the space between the circumference of the film receiving casing and the receiving member when inserting the film to guide the film into said recess.

8. A motion picture apparatus comprising the casing of the apparatus, having an opening, a frame for guiding the film across said opening, a continuously operating film feeding mechanism, a film receiving member, a continuous closed guideway adapted when inserting the film to direct the same to said receiving member, the latter being formed with a recess for receiving the end of said film, hinged guide members adapted to engage the receiving member at said recess to bridge the space between the circumference of the film receiving casing and the receiving member when inserting the film and to provide a guide for guiding the film into said recess, and means for locking said film-receiving member in the position for receiving the film.

9. A motion picture apparatus including a casing, means for feeding a film through said casing, a film-receiving casing, a rotary film-receiving member within said film-receiving casing, and hinged guide members arranged to swing into a position adjacent to each other and bridging the space between said film-receiving casing and the film-receiving member to guide the film to said receiving member, said guide members being spring-pressed outwardly, and said receiving member having a formation to temporarily hold said guide members in their position adjacent to each other and, upon the rotation of the receiving member, release said guide members and cause them to swing apart after the film has been connected with said receiving member.

10. In a self threading motion picture apparatus, a casing provided with a channel for the passage of a film band, guide means to direct the lead end of a propelled film to and from said channel, a film feeding mechanism having a path of movement normally in said channel, but shiftable so that its path of movement will no longer be in said channel, mechanism operative on the guide means to render it operative or inoperative, and means controlled by the operation of the last-mentioned mechanism to shift said feeding mechanism and rendering such feeding mechanism inoperative to feed the film when the guide means is operative to guide a film end.

11. In a self threading motion picture apparatus, a casing provided with a channel for the passage of a film band, guide means to direct the lead end of a propelled film to and from said channel and movable to and from film-directing position, a film feeding mechanism having a path of movement normally in said channel, but shiftable so that its path of movement will no longer be in said channel, and means controlled by the movement of said guide means to shift said feeding mechanism and rendering such feeding mechanism inoperative to feed the film when the guide means is operative to thread a film end.

12. In a self threading motion picture apparatus, a casing provided with a channel for the passage of a film band, sprocket means for feeding film continuously to and from said channel, guide means to direct the lead end of a film propelled by said sprocket means, toward and through said channel and from the latter to the sprocket means whereby the film is automatically threaded through the apparatus, said guide means comprising members movable to and from film-directing position, a film-feeding pawl having a path of movement normally in said channel to feed the film intermittently, but shiftable so that its path of movement will no longer be in said channel, and means controlled by the movement of the movable members of the guide means to shift said pawl and rendering such pawl inoperative to feed the film when the said guide means is operative to thread a film end automatically.

13. In a motion picture apparatus, a casing provided with means for guiding a film therethrough and with a device for threading the film through said casing, a film-feeding device having a path of movement normally in operative relation to the film but shiftable so that its path of movement will be out of operative relation to the film, an operative connection between the film-feeding device and the film-threading device, and means for shifting said film-feeding device from its operative path to its inoperative path and vice versa without stopping the movement of either of said devices.

14. In a motion picture apparatus, a casing provided with a passage for the travel of a film band, guide means for directing the film during its travel and movable to and from film-directing position, a film-feeding device having a path of movement normally in operative relation to the film but shiftable so that its path of movement will be out of operative relation to the film, and means controlled by the movement of said guide means to shift said device from its operative path to its inoperative path and vice versa and rendering such device inoperative to feed the film when the said guide means is in film-directing position.

KURT FRENZEL.